UNITED STATES PATENT OFFICE.

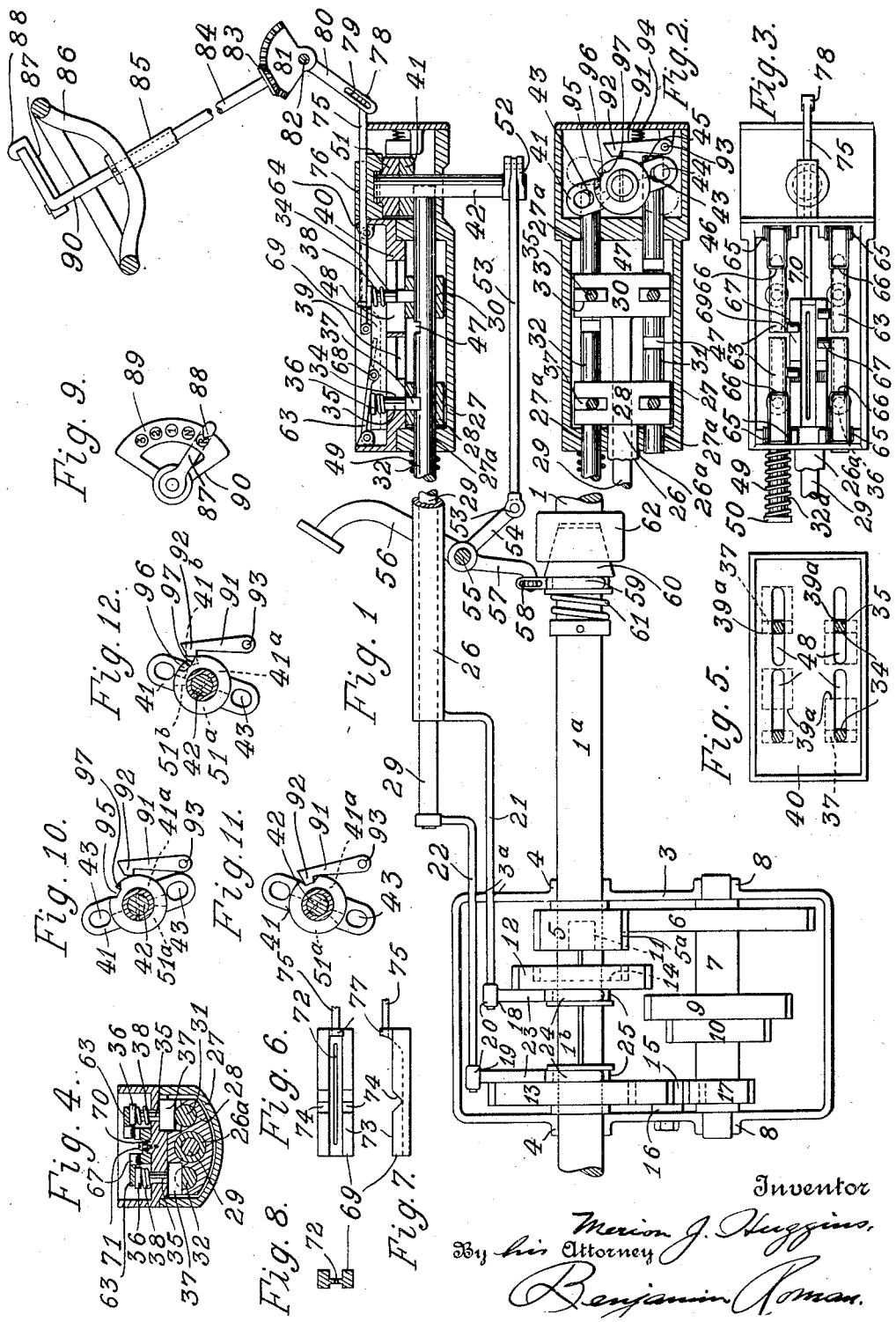
M. J. HUGGINS.
SPEED CONTROLLING MECHANISM FOR AUTOMOBILES.
APPLICATION FILED DEC. 27, 1915. RENEWED SEPT. 10, 1919.
1,326,935. Patented Jan. 6, 1920.

MERION J. HUGGINS, OF NEW YORK, N. Y., ASSIGNOR TO AUTOMOTIVE DEVELOPMENT CO., INC., OF NEW YORK, N. Y., A CORPORATION OF NEW YORK.

SPEED-CONTROLLING MECHANISM FOR AUTOMOBILES.

1,326,935.      Specification of Letters Patent.      Patented Jan. 6, 1920.

Application filed December 27, 1915, Serial No. 68,751. Renewed September 10, 1919. Serial No. 322,983.

*To all whom it may concern:*

Be it known that I, MERION J. HUGGINS, a citizen of the United States, and resident of the city of New York, in the county of Kings and State of New York, have invented certain new and useful Improvements in Speed-Controlling Mechanism for Automobiles, of which the following is a specification.

This invention relates to automobiles, particularly to the speed controlling mechanism thereof, and its principal object is to provide simple, efficient, reliable, and improved means for controlling the speed of the automobile, and for driving the automobile wheels at a variable speed relatively to the speed of the engine or prime mover.

Another object is to provide improved, conveniently operated, and readily responsive means for controlling the changing of the speeds and reversing of the wheels.

Other objects and advantages will hereinafter appear.

In the accompanying drawings,—

Figure 1 is a general view, partly in section and partly in full, showing an elevation of an automobile gear transmission, to which the invention is here shown as adapted, with the operating mechanism therefor.

Fig. 2 is a sectional plan view of the mechanism shown in Fig. 1.

Fig. 3 is a general plan view of the mechanism shown in Fig. 1.

Fig. 4 is a sectional end elevation of the mechanism shown in Figs. 1, 2, and 3.

Figs. 5, 6, 7, 8, and 9 are details of said mechanism.

Figs. 10, 11, and 12 are detail views illustrating the operation of parts of the mechanism.

A shaft 1, driven by the automobile engine not shown, drives a section $1^a$ thereof, which is split therefrom at clutch 2, Fig. 1, and extends to the gear-casing 3, where it is mounted in bearings 4 of said casing. The shaft-section $1^a$ carries a wide gear 5 which drives a gear 6 that is keyed upon and drives a countershaft 7 mounted in bearings 8 of said casing. Said countershaft carries drive gears 9 and 10 of different sizes, and the rear shaft-section $1^b$ of the drive shaft, split from shaft-section $1^a$ at 11 and running independently thereof, carries coöperating transmission gears 12 and 13 splined to shift thereupon, so that any one of said transmission gears may be caused to mesh with and unmesh from its coöperating drive gear on said counter-shaft, and various speeds may be thereby transmitted to the shaft $1^b$, which in turn drives the wheels of the automobile, not shown, at various speeds. Thus when the gears 12, 13 are unmeshed, the countershaft 7 driven by gears 5, 6 from shaft section $1^a$ runs idly and no motion is transmitted to the shaft-section $1^b$, and when the gears 13, 10 are meshed a slow speed is imparted to the shaft-section $1^b$. Likewise, when the gears 12, 9 are meshed a higher speed is transmitted to the shaft $1^b$, and when the gear 12 having an internal gear 14 is shifted to mesh the internal gear with the portion $5^a$ of wide gear 5 the shaft-section $1^b$ is driven at highest speed, directly from shaft section $1^a$. In order to rotate the shaft $1^b$ oppositely for reversing the automobile wheels, the gear 13 is meshed with an intermediate idler-gear 15, which is mounted on a stud 16 fixed to casing 3 and is driven by a drive gear 17 carried upon the countershaft 7. The gears are meshed and unmeshed by means of shifting devices 18, 19 which comprise hubs 20 that are secured to extremities of rods 21, 22 mounted in guiding ways $3^a$ of casing 3, arms 23 extending from said hubs, and forked portions 24 at the extremities of said arms that embrace shouldered collars 25 of the shiftable gears.

The rod 21 extends outwardly from the casing 3 where it is fixed to a tubular bar or sleeve 26, which extends over to and passes through the casing 27 of the operating mechanism, Figs. 1, 2, and 3, wherewithin its extremity $26^a$ is fixed to a shifting block 28. In a similar manner, the rod 22 is secured to a bar 29 which passes through the entire sleeve 26 and block 28 and into the casing 27, wherein it is fixed to a similar shifting block 30. Both of the blocks 28, 30 are carried upon shifting rods 31, 32 that are mounted in guiding ways $27^a$ of casing 27. Within notches 33 in each of the shifting blocks 28, 30 is carried a pair of locking latches 34, each of which consists of a pin 35 having a flange 36 and a flattened portion 37 the lower part of which is located within the notch 33. And normally a spring 38 surrounding each of said pins presses against its flange 36 and lodges the upper part of its portion 37 within a receiving recess 39 formed in a plate 40 secured to the casing 27, whereby the shifting block is firmly maintained locked and shifting thereof is prevented while the gear connected thereto is maintained locked in unmeshed state. The latch 34 opposite rod 31 bears against edge of its recess 39 to prevent movement of its shifting device and gear connected thereto toward the right, and the adjacent latch of the same device bears against the edge of its recess 39 to prevent movement of the gear toward the left. The rods 31, 32 are parallel to each other and each is shiftable longitudinally toward the left and toward the right, as viewed in the drawing, through the guiding ways 27ᵃ and through the shifting blocks 28, 30. A link-plate 41 pivoted centrally upon a shaft 42 which in turn is pivotally mounted in the plate 40 and in the casing 27 is provided at its ends with elongated openings 43 which fit over pins 44 projecting upwardly from wings 45 which extend right angularly from the extremities 46 of the rods 31, 32. Upon swinging or oscillating of the connecting link 41 about its pivot, from the position shown in Fig. 2 to that shown by the dash and dot lines, and back, a stroke may be simultaneously imparted to both of said rods, whereby the one designated 31 will move first forwardly toward the left and then backwardly toward the right to the initial position shown, while the rod 32 will simultaneously perform its stroke oppositely, first forwardly toward the right and then backwardly toward the left to initial position. In each of the rods 31, 32 are formed notches 47 which register with the latches 34 when said rods are at the termination of the forward portion of their simultaneous stroke, and upon pressing down any one of the latches 34, contrary to spring 38, toward the rod opposite thereto, just before said rods are shifted or just before they have completed the forward portion of their stroke, the upper part of its flat portion 37 is caused to leave its recess 39 in plate 40 and the lower part of this portion is compelled to enter its registering notch 47 in the rod, whereby the particular shifting block 28 or 30, carrying said latch is thus unlocked from the plate 40 and locked firmly to the rod 31 or to the rod 32, depending upon which of the two latches 34 of the particular shifting block has been thus pressed. And hence, upon the backward portion of the simultaneous stroke of the rods 31, 32 said locked shifting block is carried along and shifted toward the right, as viewed in the drawing, if its latch 34 which is opposite the rod 31 has been previously pressed, but if its other latch 34 has been pressed and the shifting block thus locked to the rod 32 it is carried along by this rod in the opposite direction and shifted from neutral position toward the left, in which manner the gear connected to this shifting block can be shifted in opposite directions from a neutral position and meshed with either of its coöperating drive gears. Conversely, during the forward portion of a subsequent stroke of the rods 31, 32 the shifting block previously locked thereto is shifted back, toward the left or toward the right, depending upon whether the shifting block has been locked to the rod 31 or to the rod 32, and the spring 38 of the latch which was maintaining said block locked to the rod causes the latch-portion 37 to clear its notch 47 of the rod and to reënter its recess 39 in plate 40 whereby the shifting device is restored to initial or locked neutral position and the gear carried thereby is unmeshed. Upon the backward portion of the same subsequent simultaneous stroke of the rods 31, 32 they either return idly or together with the other shifting block or with the same shifting block, according to whichever of said blocks has been locked to one or the other of said rods. During the movement of the shifting block both of its latches 34 are carried along therewith and the lower part of the flat portion 37 of that latch which has been pressed is maintained within its notch 47 of the rod by the plate 40 bearing upon the upper face of said flat portion 37, the pin 35 of said latch being meanwhile retained within an elongated slot 48 in the plate 40, Figs. 1 and 5, and the other latch being meanwhile permitted to travel along idly with the moving shifting block by having its pin 35 retained within a similar slot 48 and the upper part of its flat portion 37 traveling within its recess 39, which is made elongated as shown, to provide clearance while it is traveling idly. The movement of the rods 31, 32 during the forward portion of their stroke simultaneously compresses a spring 49, which is located outside of the casing 27, surrounds the rod-end 32ᵃ, and is adapted to press against a flange 50 of said rod-end and against the end of the guiding way 27ᵃ. Upon releasing of the link 41, after having been swung to the position shown by the dash and dot lines, it permits the spring 49, which has been thus previously compressed, to shift the rod 32 back toward the left and consequently through the link 41, the rod 31 back toward the right, and incidentally said link is swung back in a counterclockwise direction to the normal position shown. The link 41 is oscillated to actuate the rods 31, 32 by means of a circular cam 51, which is centrally mounted upon and fixed to the shaft 42 and is partially rotated with said shaft by a lever 52 fixed to the shaft. When said cam is rotated in a clockwise direction a segmental thickened portion 51ᵃ thereof strikes a similar portion 41ᵃ of link 41 and thereby swings said link about its pivot. A link 53 connects the lever 52 with an arm 54 secured to a rock-shaft 55 that constitutes the fulcrum of a pedal 56, which is utilized for operating the drive-shaft clutch 2. Upon pressing of the foot-pedal 56 to swing it toward the right and releasing it to permit its return swinging toward the left, in the operation of the clutch, the cam is thereby rotated partially in opposite directions to oscillate the link 41, to release it in the manner hereinafter seen, and, in conjunction with the action of spring 49, to move the rods 31, 32 to perform their simultaneous forward and backward stroke in the above described manner. Said pedal is connected to the clutch 2 by means of an arm 57 thereof which is slidably joined to the slotted extension 58 of a fork 59 that embraces the cone-portion 60 of the clutch. Pressing of the pedal 56 moves the cone portion 60 toward the left contrary to the pressure of clutch-spring 61 and disengages it from its coöperating clutch member 62 to unclutch the shaft-portions 1, 1ª. Releasing of the pedal causes the spring 61 to engage the cone portion 60 with the member 62 to clutch the shaft-portions 1, 1ª, and to simultaneously swing the pedal back toward the left to its normal position shown in the drawing.

For each of the latches 34 is provided an actuating lever 63 hinged to plate 40 at 64, and a spring 65 secured to plate 40 and wound around at each side of the lever-hinge is bent at 66 to extend on top of the lever 63, whereby said lever tends to bear down upon its latch 34 so as to compel it to enter its registering rod-notch 47 at the moment the rods 31, 32 reach the termination of the forward portion of their stroke. Each of the levers 63 carries a roller 67 mounted upon a stud 68 projecting therefrom. An elongated block 69 located centrally between the levers 63 is seated upon a track 70 of the plate 40 and is slidably held thereto by means of a stud 71 passing through a slot 72 thereof threading into said track. The lever-rollers 67 bear against the top surface 73 of the block 69 and in this manner maintain the levers 63 in inoperative state, whereby they are normally prevented from pressing against the latches 34 contrary to the power exerted by their springs 38. And when the block 69 is slid along its track 70 so as to aline a notch 74 thereof with any one of the rollers 67, such roller drops into said notch and the lever 63 carrying said roller is thereupon permitted to be pressed down by its spring 65 and to operate its latch 34 to compel it to enter its rod-notch 47 and lock its shifting block to the shifting rod opposite thereto. A rod 75 mounted in a guiding way 76 of the plate 40 is secured at one end to a lug 77 of the block 69 and at its other end 78 is joined to a slotted end 79 of an arm 80 secured to a gear-segment 81 fulcrumed upon a shaft 82. Said gear-segment meshes with a bevel gear 83 keyed upon a rod 84 which extends through and outwardly from the steering column 85 of the machine. The rod 84 is provided at its extremity above the steering wheel 86 with a lever 87 wherewith it may be rocked to rotate the gear 83, swing the segment 82 and arm 80, and impart a stroke to the block 69 toward the right or toward the left, as viewed in the drawing, to thereby aline its notch 74 with any one of the rollers 67. A pointer 88 extends from the extremity of lever 87 and around the outer side of a segmental frame 89, which is concentric with the rod 84 and is secured to the column 85 by means of brackets 90. Upon the frame 89 are marked speed indications, such as "Reverse" or "R" "Neutral" or "N", "1st", "2nd", and "Direct" or "3rd", and the lever 87 with its pointer 88 may be swung to point to any one of said indications.

In the operation of the gear transmission the lever 87 may be set to point to any one of the indications upon indicator-frame 89, according to whichever coöperating pair of gears it is desired to mesh in the selection of speeds for the automobile wheels, and we will assume that said lever has been set to point to "R" or "Reverse," as shown. The block 69 is thereby set to bring its notch 74 underneath the roller 67 of the actuating lever 63 that belongs to and coöperates with the locking-latch 34 located in shifting block 28 opposite to the rod 32, and the lever 63 is thereupon caused to press said latch against said rod. Lever 87 having been set to the desired speed indication the remaining step in the operation of selecting a particular speed is to press and release the foot-pedal 56. Upon pressing of the foot-pedal the drive-shaft portions 1, 1ª are unclutched, and during the unclutching operation the cam 51 is first rotated idly Fig. 10, to permit actual disengagement of clutch-members 60, 62, and then the cam-portion 51ª strikes the link-portion 41ª, whereupon the link 41 is oscillated and the rods 31, 32, are moved to perform the forward portions of their strokes, the rod 31 moving toward the left and the rod 32 moving simultaneously toward the right contrary to the pressure of spring 49. This movement of said rods alines their notches 47 with the locking latches 34 and carries back therewith any shifting block 28 or 30 that may have been locked thereto, and unmeshes or neutralizes the gear connected to such block and locks the block with its gear firmly in neutralized state to the fixed plate 40. A pawl 91 having its engaging head 92 sufficiently wide to bear simultaneously against the edges of link-plate 41 and cam-plate 51 is hinged at 93 to casing 27 and is pressed upon by a spring 94 which compels it to normally bear against the edges of said link and cam. At the termination of the said movement of the rods 31, 32, and of the rotation and swinging of cam 51 and link 41, the engaging head 92 of pawl 91 drops into a notch 95 in link 41 and into a notch 96 in cam 51, Fig. 11, and thereby engages said link in its swung position and locks the rods 31, 32 in shifted position with the spring 49 in compressed state. At this moment the lever 63, having been just previously permitted to press its latch 34 against rod 32, causes its latch to enter into its registering notch 47 and to lock the shifting block 28 to the rod 32. Upon the immediate releasing of the pedal 56 the shaft-portions 1, 1ª are clutched, and during the first part of the clutching operation and of the releasing movement of the pedal the cam plate 51 rotates backwardly in a counter clockwise direction, and the edge 51ᵇ of its thickened portion 51ª, moves away from and clears the edge 41ᵇ of the thickened link-portion 41ª without affecting the link-plate 41. During the interval of the initial part of the rotatable stroke of cam 51 a beveled cam-portion 97 at the side of its notch 96 engages the pawl-head 92 and forces the pawl 91 out of the link-notch 95, Fig. 12, whereby said pawl and the link become disengaged and the rods 31, 32 with the compressed spring 49 are thus released. Said spring thereupon immediately actuates the rods 31, 32 and imparting a snap movement thereto moves them to simultaneously perform the backward portions of their strokes, that of the rod 31 toward the right and the rod 32 toward the left, whereupon the rod 32 carries therewith the shifting block 28 locked thereto and shifts it with its gear 13 toward the left and meshes the gears 13, 15. The actual meshing of the gears, therefore, is performed solely by the action of spring 49, which upon being released is permitted to impart the snap movement to the rods 31, 32 without any coaction of their actuating cam 51 and independent of the releasing movement or control of the pedal 56 or the operation of the clutch 2. In shifting of the gears the spring 49 is first caused to be compressed during the pressing of the pedal 56 and the unclutching operation, during the releasing of the pedal and the first part of the clutching operation the spring 49 is maintained locked in compressed state and the actuating cam 51 is rotated back idly to clear the edge 41ᵇ of the link-portion 41ª, and during the termination of the clutching operation said spring is unlocked and permitted to impart the snap movement to the rods 31, 32, which thus shift the selected gear without control to mesh it with its co-operating gear. In addition to the mentioned functions of spring 49 it also serves to positively maintain the shifted gear in place and prevents accidental unmeshing thereof. It will be evident that the entire above described operation, of selecting and shifting the gears, is momentarily performed, requiring on the part of the operator merely the setting of the lever 87 and pressing of the pedal 56.

Should it be desired to unmesh the gears 13, 15, and to mesh any other coöperating pair of gears such as the gears 13, 10 for low speed, the lever 87 is set to point at "1," corresponding to such selection of speed, and it thereby sets the block 69 to aline its notch 74 with the roller 67 of actuating-lever 63 belonging to the latch 34 opposite the rod 31 in shifting block 28. Then the pedal 56 is pressed and released, whereupon the rods 31, 32 are actuated and the rod 32 moves the shifting block 28 and the gear 13 back, and thereby unmeshes the gears 13, 15 and locks the said shifting block with the gear 13 to the plate 40 in unmeshed or neutral position. The shifting block 28 is at this moment locked to the rod 31, and then the spring 49 moves the rods 31, 32 and causes the rod 31 to shift the block 28 with the gear 13 from neutral position toward the right and meshes the gears 13, 10.

It will be seen by following the mechanism in the drawings, that in a similar manner setting of the lever 87 to point at "2nd" or intermediate speed and pressing of the pedal 56 will first unmesh and neutralize any coöperating pair of gears that may be meshed, the actuating lever 63 belonging to the latch 34 opposite the rod 32 in shifting block 30 will then lock said block to the rod 32, and said rod will then move and mesh the gears 12, 9. Likewise setting of the lever 87 to point at "3rd" or highest speed and pressing of said pedal will actuate the lever 63 belonging to latch 34 opposite rod 31 in shifting block 30 and will lock said block to the rod 31, and said rod will then move and mesh the internal gear 14 inside of gear 12 with the gear 5 for direct driving.

Should it be desired to unmesh or neutralize any coöperating pair of gears that may be meshed, without necessarily selecting any other speed or meshing any other pair of gears, the lever 87 may be set to point at "Neutral" or "N" upon indicator frame 89. The block 69 is thereby set to dispose its notch 74 between the two rollers 67 of levers 63 belonging to the shifting block 28 and causes all of the levers 63 to be simultaneously maintained in inoperative state, so that upon subsequently pressing of the pedal 56 any gear that may be in mesh is unmeshed and restored to locked neutral position. It will be evident that with this mechanism any predetermined selection of speed desired may be made at any time before or after the swinging of the pedal 56 to perform the clutching operation of the drive-shaft, and such speed selection may be also made at any time and stage during the clutching operation.

Variations may be resorted to within the scope of the claims, and portions of the improvements may be used without others.

Having thus described my invention, I claim:—

1. In an automobile, the combination with shiftable gears for a variable speed transmission, of shifting devices for said gears, a movable member, means to move said member, locking means for each of said devices to lock it to said member in one position of said locking means and in another position to unlock it from said member and locking the shifting device against movement, and a movable member to operate any one of said locking means.

2. In an automobile, the combination with shiftable gears for a variable speed transmission, of a movable member, means to move said member, spring retracted locking means for shiftable gear to lock it to said member and means coöperating with said locking means in the retracted position of the same to maintain a gear in unmeshed position, and a movable member to operate any one of said locking means.

3. In an automobile, the combination with shiftable gears for a variable speed transmission, of shifting devices for said gears, a movable member, means to move said member, a latch for each of said devices to lock it to said member, means for each of said latches to actuate it to lock its device to said member, and a movable member, said means being held normally inoperative to release any one of said latch-actuating means.

4. In an automobile, the combination with shiftable gears for a variable speed transmission, of shifting devices carried by said gears, a movable member, means to move said member, a latch for each of said devices to lock it to said member, a spring to maintain said latch away from said member, a spring-operated actuator for each of said latches, a member adapted to maintain said actuators in inoperative state, and means to move said latter member to set it to permit any one of said actuators to operate its latch contrary to its spring for locking its device to said former member.

5. In an automobile, the combination with drive gears, and transmission gears, of shifting devices for said gears, a movable member, means to move said member, a latch moving with each of said devices to lock it to said member, a fixed member engaged by the latch in its unlocked position to lock the shifting devices and connected gear away from meshing position of the gear, a spring-operated actuator for each of said latches, a member adapted to maintain said actuators in inoperative state, and means to move said latter member to set it to permit any one of said actuators to operate its latch for locking its device to said former member.

6. In an automobile, the combination with shiftable gears for a variable speed transmission, of shifting devices for said gears, a movable member, means to move said member, locking means carried by each of said devices to lock it to said member, an actuator for each of said locking means, a fixed member engaged by said locking means in its unlocking position to hold the shifting devices and connected gears in unmeshed state, a movable member adapted to maintain said actuators in inoperative state, and means to move said latter member to set it to permit any one of said actuators to operate its locking means for locking its device to said former member.

7. In an automobile, the combination with shiftable gears for a variable speed transmission, of shifting devices for said gears, a rod movable longitudinally in a direction parallel to the axes of said gears, means to move said rod, means for each of said devices to lock it to said rod at points therealong, and a member movable in a direction parallel to said rod to operate any one of said locking means.

8. In an automobile, the combination with shiftable gears for a variable speed transmission, of shifting devices for said gears, a rod movable longitudinally in a direction parallel to the axes of said gears, means to move said rod, a latch for each of said devices to lock it to said rod, a spring to maintain said latch away from said rod, a spring-operated actuator for each of said latches, a member movable in a direction parallel to said rod adapted to maintain said actuators in inoperative state, and means to move said member and set it to permit any one of said actuators to operate its latch contrary to its spring for locking its device to said rod.

9. In an automobile, the combination with shiftable gears for a variable speed transmission, of shifting mechanism, means for each coöperating pair of gears to connect or disconnect one of its gears with said mechanism, said means embodying independently movable latches one for each driving position of the gear, and a movable member to operate any one of said latches.

10. In an automobile, the combination with shiftable gears for a variable speed transmission, of shifting devices for said gears, shifting mechanism, means for each of said devices to lock it to said mechanism, said means comprising a pair of independently operable spring retracted latches constantly connected with the shifting devices, a fixed member engaged by the latches when in retracted position to hold the shifting devices in neutral, an actuator for each of said locking latches, a movable member adapted to maintain said actuators in inoperative state, and means to move said member to set it to permit any one of said actuators to operate its locking means for locking its device to said mechanism.

11. In an automobile, the combination with driving means, a drive shaft, and sets of power transmitting elements for transmitting variable speeds to said shaft, of selecting means for each of said sets embodying for each set a pair of independently retracted locking devices locking said set in neutral position, and a movable member to operate any one of said selecting means and any one of the locking devices thereof to free its set and permit shift of the same in one direction.

12. In an automobile, the combination with driving means, a drive shaft, and sets of elements for transmitting variable speeds to said shaft, of selecting means for each of said sets consisting of a pair of independently operable locking devices normally carried by said set and normally locking the same in neutral, independently operated actuators one for each element of said selecting means, a movable member adapted to maintain said actuators in inoperative state, and means to move said member to set it to permit any one of said actuators to operate its selecting means.

13. In an automobile, the combination with shiftable gears for a variable speed transmission, of shifting devices for said gears, movable members, means to move said members in opposite directions, means for each of said devices to lock it to any one of said members, and a movable member to operate any one of said locking means.

14. In an automobile, the combination with shiftable gears for a variable speed transmission, of shifting devices for said gears, movable members, means to move said members in opposite directions, spring retracted locking means for each of said devices to lock it to any one of said members, actuating means for each of said locking means operating thereon by spring pressure to overcome the retracting influence, a movable member adapted to maintain said actuating means in inoperative state, and means to move said latter member to set it to permit any one of said actuating means to operate its locking means for locking its device to one of said former members.

15. In an automobile, the combination with shiftable gears for a variable speed transmission, of shifting devices for said gears, movable members, means to move said members in opposite directions, a pair of spring retracted latches carried by each of said devices to lock it to any one of said members, said latches when retracted being engaged with a fixed member to normally lock the shifting device in neutral, means for each of said latches to actuate it to lock its device to said members, and a movable member to operate any one of said latch-actuating means.

16. In an automobile, the combination with shiftable gears for a variable speed transmission, of shifting devices for said gears, a movable member having a forward and backward movement, means to move said member, means for locking the shifting devices against movement in the direction of the forward movement of said movable member, said means being permitted to travel along idly in the opposite direction, means for each of said devices to lock it to said member, a movable member to operate any one of said locking means, a lever, and means to transmit the movement of said lever to said latter member.

17. In an automobile, the combination with shiftable gears for a variable speed transmission, of shifting devices for said gears, means for positively locking the shifting devices to hold the gears in neutral, a movable member, means to move said member, means for each of said devices to lock it to said member, a movable member to operate any one of said locking means and at the same time free the shifting device to permit movement of the gear in the desired direction, a lever, a rod rocked thereby, and means to transmit the actuation of said rod to move said latter member.

18. In an automobile, the combination with shiftable gears for a variable speed transmission, of shifting devices for said gears, a shifting block for each shifting device, a spring retracted latch for each block, a movable member comprising a notched rod movable forwardly and backwardly through said blocks, a spring actuated and spring retracted latch to move said member, means for each of said blocks to lock it to said member, a movable member to operate any one of said locking means, an indicator, a lever adapted to be swung to point toward indications along said indicator, and mechanism to transmit the movement of said lever to said latter member.

19. In an automobile, the combination with shiftable gears for a variable speed transmission, of shifting devices for said gears, a movable member, means to move said member, a spring retracted and spring actuated latch for each of said devices to lock it to said member, said latch operating when retracted to normally hold the device against movement in one direction, means for each of said latches to actuate it to lock its device to said member, a movable member to operate any one of said latch-actuating means, a lever, a rod rocked thereby, and means to transmit the actuation of said rod to move said latter member.

20. In an automobile, the combination with shiftable gears for a variable speed transmission, of shifting devices for said gears, a movable member, means to move said member, means for each of said devices to lock it to said member, an independent spring for each locking means normally holding the same in unlocking position and independent spring operated actuator acting by a spring of superior power on each of said locking means, a movable member adapted to maintain said actuators in inoperative state, an indicator, a lever adapted to be swung to point toward indications along said indicator, and mechanism to transmit the movement of said lever to said latter member to set it to permit any one of said acuators to operate its locking means for locking its device to said former member.

21. In an automobile, the combination with drive gears, and transmission gears, of shifting mechanism, means for locking a gear of each coöperating pair in neutral, said means comprising a fixed member having two lock-receiving recesses elongated in opposite directions, means for each coöperating pair of gears to connect one of its gears with said mechanism and at the same time free the gear to permit the shift desired, a movable member to operate any one of said means, an indicator, indicating means adapted to be moved relatively to said indicator, and means to transmit the movement of said indicating means to said member.

22. In an automobile, the combination with driving means, a drive shaft, and sets of elements for transmitting variable speeds to said shaft, of selecting means for each of said sets, said selecting means comprising a series of independently operable spring retracted latches, a movable member to operate any one of said selecting means, an indicator, indicating means adapted to be moved relatively to said indicator, and means to transmit the movement of said indicating means to said member.

23. In an automobile, the combination with shiftable gears for a variable speed transmission, of shifting devices for said gears, movable members, means to move said members in opposite directions, means for each of said devices operable independently of the means for the other to lock it to any one of said members, and normally standing in position to lock the shifting device and connected gear in neutral, a movable member to operate any one of said locking means, an indicator, indicating means adapted to be moved relatively to said indicator, and means to transmit the movement of said indicating means to said member.

24. In an automobile, the combination with shiftable gears for a variable speed transmission, of shifting devices for said gears, movable members, means to move said members in opposite directions, a pair of latches for each of said devices to lock it to any one of said members, each latch of the pair being adapted to be shifted into and out of locking position without change of position of the other latch of said pair and independently of the latch which locks with any other member, means for each of said latches to actuate it to lock its device to said members, a movable member to operate any one of said latch-actuating means, an indicator, a lever adapted to be swung to point toward indications along said indicator, and mechanism to transmit the movement of said lever to said latter member.

25. In an automobile, the combination with shiftable gears for a variable speed transmission, of shifting devices for said gears, movable members, means to move said members in opposite directions, means for each of said devices to lock the same normally against shifting or to lock it to any one of said members, actuating means for each of said locking means, a movable member adapted to maintain said actuating means in inoperative state, a lever, a rod rocked thereby, and means to transmit the actuation of said rod to move said latter member to set it to permit any one of said actuating means to operate its locking means for freeing the shifting device and locking the same to one of said former members.

26. In an automobile, the combination with drive gears, and transmission gears, of shiftable members, movable members, means to move said members in opposite directions, means to lock any one of said shiftable members to any one of said movable members, a sleeve connecting one of said shiftable members with one of said gears, and a rod extending through said sleeve connecting the other of said shiftable members with another of said gears.

27. In an automobile, the combination with shiftable gears for a variable speed transmission, of shifting devices for said gears, rods movable longitudinally in a direction parallel to the axes of said gears, means to move said rods in opposite directions, a pair of latches for each of said devices to lock it to any one of said rods at points therealong, shifting blocks carrying said latches, a slotted plate through which the latches work and move in the slots longitudinally, said plate being provided with recesses adapted to receive the latches when retracted from engagement with the rod, said recesses being located so that the latches will engage an edge of the recess to hold the shifting device against movement in one direction, springs one for each latch for raising the same, and a member movable in a direction parallel to said rods to actuate any one of said latches to depress the latches into engagement with the rod.

28. In an automobile, the combination with shiftable gears for a variable speed transmission, of shifting devices for said gears, means for positively locking each shifting device during the shifting of the other, rods movable longitudinally in a direction parallel to the axes of said gears, and each provided with two notches in one side of the rod, means connected with the clutch to move said rods in opposite directions, means for each of said devices to lock it to any one of said rods, and consisting of a pair of latches and a common support therefor connected to each device, and a member movable in a direction parallel to said rod to operate any one of said locking means.

29. In an automobile, the combination with shiftable gears for a variable speed transmission, of shifting devices for said gears, rods movable longitudinally in a direction parallel to the axes of said gears, means to move said rods in opposite directions, means for each of said devices to lock it to any one of said rods, said means embodying latches carried by the shifting devices, a fixed member having locking recesses in which the latches are normally retained, said recesses being elongated to permit shift in one direction, spring operated actuators one for each latch, a member movable in a direction parallel to said rod to operate any one of said locking means, an indicator, indicating means adapted to be moved relatively to said indicator, and means to transmit the movement of said indicating means to said member.

30. In an automobile, the combination with shiftable gears for a variable speed transmission, of shifting devices for said gears, rods movable longitudinally in a direction parallel to the axes of said gears, means to move said rods in opposite directions, a pair of latches for each of said devices to lock it to any one of said rods at points therealong, a fixed locking plate having an elongated recess on its under side, springs one for each latch normally maintaining the latch in said recess, a member movable in a direction parallel to said rods to actuate any one of said latches, a lever, a rod rocked thereby, and means to transmit the actuation of said rod to move said latter member.

31. In an automobile, the combination with drive gears, and transmission gears, of shiftable members, means to lock said shiftable members in neutral, movable members, means to move said members in opposite directions, means to unlock any one of said shiftable members and at the same time lock it to any one of said movable members, and an extension connecting each of said shiftable members with one of said gears.

32. In an automobile, the combination with drive gears, and transmission gears, of shifting mechanism, means for locking a gear of each coöperating pair in neutral and comprising two locking devices acting respectively to hold the gear against movement in one direction only and permit movement in the opposite direction, means for each coöperating pair of gears to place it in operative relation with said mechanism and at the same time free one of said locking devices to allow shift in the desired direction, and a movable member to operate any one of said means.

33. In an automobile, the combination with driving means, a drive shaft, and sets of elements for transmitting variable speeds to said shaft, of means for each of said sets to place it in driving relation with said shaft, said means comprising actuating rods connected to the clutch pedal and movable by said pedal in opposite directions in the act of freeing the clutch, a pair of latches for each set of elements mounted to move with its set in the shifting action to vary the speed, independent springs operating on said latches to retract the same and cause each to be normally maintained in a locking recess, and a movable member to operate any one of said latches.

34. In an automobile, the combination with drive gears, and transmission gears, of shifting mechanism, normally spring retracted means for each coöperating pair of gears to connect one of its gears with said mechanism, a yieldable actuator for each of said connecting means having an actuating spring superior in power to the retracting spring for said connecting, a movable member adapted to maintain said actuators in inoperative state by supporting the same against the influence of the actuating spring therefor and means to move said member and set it to free any one of said actuators and permit said spring to operate its connecting means.

Signed at the city of New York, in the county of New York, and State of New York, this 23rd day of December, A. D., 1915.

MERION J. HUGGINS.

Witnesses:
CHAS. W. LA RUE,
B. NORMAN.